United States Patent [19]
Wollner

[11] Patent Number: 5,910,529
[45] Date of Patent: *Jun. 8, 1999

[54] GEL COMPOSITION HAVING THICKENING AGENT PROVIDING BINGHAM PLASTIC PROPERTIES

[75] Inventor: Mark R. Wollner, Woodbury, Minn.

[73] Assignee: Minnesota Mining & Manufacturing Co., St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/771,752

[22] Filed: Dec. 20, 1996

[51] Int. Cl.$^6$ .............................. C08K 3/34; C08K 5/098; B01J 13/00

[52] U.S. Cl. .............................. 524/394; 451/28; 516/78; 516/79; 524/446; 524/832; 524/916; 524/921; 526/932

[58] Field of Search .............................. 252/315.4, 315.5; 524/394, 916, 921, 832, 446; 526/932; 106/468; 516/78, 79; 514/944

[56] References Cited

U.S. PATENT DOCUMENTS

| | | | |
|---|---|---|---|
| 3,054,762 | 9/1962 | Rees | 524/832 X |
| 3,248,356 | 4/1966 | Snyder | 524/832 X |
| 3,657,175 | 4/1972 | Zimmerman | 526/932 X |
| 3,891,591 | 6/1975 | Chang et al. | 524/144 |
| 4,040,974 | 8/1977 | Wright et al. | 252/315.2 |
| 4,054,537 | 10/1977 | Wright et al. | 423/331 |
| 4,351,754 | 9/1982 | Dupré | 524/445 |
| 4,371,290 | 2/1983 | Ivanov et al. | 405/150 |
| 4,581,413 | 4/1986 | Kim | 525/221 |
| 4,797,440 | 1/1989 | Schofield et al. | 524/394 X |
| 5,204,401 | 4/1993 | Anderson, Jr. et al. | 524/446 X |
| 5,418,271 | 5/1995 | Burba, III et al. | 524/916 X |

FOREIGN PATENT DOCUMENTS

| | | | |
|---|---|---|---|
| 0103 118 B1 | 3/1986 | European Pat. Off. | C08F 220/18 |
| 714 958 A2 | 6/1996 | European Pat. Off. | C09D 7/00 |
| 2 349 541 | 11/1977 | France . | |
| SHO 16-12378 | 1/1988 | Japan . | |
| 2073 609 | 10/1981 | United Kingdom | B05D 5/06 |
| WO95/08405 | 3/1995 | WIPO | B05D 7/14 |
| WO 96/32450 | 10/1998 | WIPO . | |

OTHER PUBLICATIONS

*Carbopol® Thickeners for Industrial Applications, Thickening & Suspending with Carbopol® Resins*, Number One in a Series, BF Goodrich, Apr. 1995.
*Laponite® The Clear Leader in Inorganic Colloids*; Southern Clay Products, Gonzales, Texas, USA 78629, 1989.
*Summary of Laponite® Properties (S–1)*; Southern Clay Products, Gonzales, Texas, USA 78629, pre 1989.
*Laponite® Technical Bulletin L–24, Household Products and Cleaners*; Southern Clay Products, Gonzales, Texas, USA 78629, pre 1989.
*Laponite® RDS, Rheological Additive*; Southern Clay Products, Gonzales, Texas, USA 78629, 1993.
*Laponite® Guidelines for Handling and Dispersion*; Southern Clay Products, Gonzales, Texas, USA 78629, 1993.
*Laponite® Properties and Applications*; Southern Clay Products, Gonzales, Texas, USA 78629, 1993.
Material Safety Data Sheet 11–2032–8, Home and Commercial Care Division, Minnesota Mining and Manufacturing Company, Aug. 26, 1996.
Untitled 3–page reference regarding *Laponite® Chemistry and Structure*, pre 1989.

*Primary Examiner*—Richard D. Lovering
*Attorney, Agent, or Firm*—Janice L. Dowdall

[57] ABSTRACT

A water based gel guide coat composition and a method of using is provided. The composition comprises:

aqueous dispersion(s) comprising a binder(s), aqueous emulsion(s) comprising a binder(s), and/or combinations thereof, having a minimum film forming temperature of 22° C. or less;

thickening agent of a type and in a sufficient amount to provide the composition with Bingham plastic properties upon shear;

optionally additional water;

water dispersible inorganic pigment(s); and optional pH adjusting agent;

the composition pH being about 6 to about 9.

33 Claims, No Drawings

GEL COMPOSITION HAVING THICKENING AGENT PROVIDING BINGHAM PLASTIC PROPERTIES

FIELD OF THE INVENTION

The present invention relates to a water based guide coat composition that can be used to detect defects on surfaces and to its use in surface finishing processes.

BACKGROUND OF THE INVENTION

Many surface finishing processes, particularly repair processes in the automotive refinishing industry and marine industry, involve the application of fillers to imperfections in the surface followed by progressive abrasion with coarser to finer abrasive materials until the desired smooth surface is achieved. A series of protective coatings is applied, e.g., primer, paint coats, lacquers and so forth, and each layer is normally rubbed down prior to application of the next coat in order to ensure a smooth even surface.

In order to assist the operator in identifying areas requiring abrasion and highlighting defects during the repair process, the operator applies a guide coat to the surface being treated. A guide coat is applied to repair areas of a variety of articles such as vehicles (boats, automobiles, trucks, trains, planes, etc.), shower tubs, spas, etc. Examples of materials which have been used as guide coats on surfaces such as gel coats, putties and paints are spray paint, powders, grease pencils, and gun metal bluing compounds such as Dykem bluing compound available from Dykem Company, St. Louis, Mo., USA. These guide coats help one visualize the high and low spots during sanding. An area where guide coat remains after sanding is a low spot, whereas an area where the guide coat has been removed by sanding indicates a high spot. Thus, the surface irregularities are clearly visible to the operator, enabling the operator to abrade and fill the appropriate areas.

Guide coats are also used when sanding between grades of coated abrasives. This ensures complete sand scratch removal of the previous grade of sandpaper before continuing on to the next finer grade of paper. When the guide coat is gone from the sand scratch area, this indicates that all the previous sanding marks have been removed.

The outer skin of an article to be sanded, such as a boat, may be a gel coat which is usually a pigmented polyester resin, less commonly, epoxy or vinyl ester. Examples of other outer skins which guide coats may be used on include paints such as acrylics, polyurethanes, melamines, epoxies, etc.

Known guide coats have a number of disadvantages. For example, grease pencils can potentially smear, provide inadequate coverage, interfere with the cutting properties of the sanding article, and easily become lost or misplaced.

Spray paints can also be disadvantageous as guide coats. For example, the automotive aftermarket tends to use lacquer spray paint as a guide coat. This is an aerosol that is sprayed onto the surface and allowed to dry. The trend is to move away from aerosols for environmental reasons. The drying time is varied but does not allow the technician to sand the area for quite some time. Then, when the sanding begins, the sand paper tends to load quickly with the spray paint, forcing the technician to change sheets of sand paper more frequently. Also, the spray paint tends to float around the body shop (or other location where the sanding is taking place) and contaminate other surfaces. Depending upon where the paint lands it can be quite difficult to remove.

Gun metal bluing compounds can also be disadvantageous as guide coats. The marine industry tends to use a gun metal bluing compound (Dykem) as a guide coat which has many problems associated with it as well. The product has to be diluted (usually with acetone) before it can be used. Acetone is flammable, regulated and generally not welcome by a marine original equipment manufacturer (OEM) in the work environment. The diluted product is typically applied to a rag and wiped onto a vertical surface of the boat to be sanded with much of the product running down the surface. This bluing compound dries immediately and sanding begins. If the surface to be sanded is a porous gel coat such a guide coat cannot be removed without sanding down to the bottom level of the pores thus requiring extensive sanding with a coarser material than what was first needed. Then the area has to be sanded with increasingly finer grades of material before compounding can begin.

Kokai patent application No SHO 16-12378, published Jan. 19, 1988, discloses a touch up method for automobiles using a guide coat which is, in general, black paint.

SUMMARY OF THE INVENTION

A need exists for a guide coat composition which has the following desirable characteristics: is free of volatile organic compounds; is water based, is fast drying; is film forming at room temperature (22 degrees C.) or below without the need for organic solvents; is ready to use with no premixing required immediately prior to use; is easily applied without dripping; is easily visible; is useful on a variety of surfaces; is even spreading; has good water resistant properties for wet sanding; does not readily load or clog abrasives; demonstrates less difficulty in having its overspray removed; is easily sanded away; and is less likely to stain newly sanded surfaces.

The present invention provides such a guide coat composition. A guide coat composition has been discovered that is water based (volatile organic compound free), that is ready to use, that requires no premixing immediately prior to use, that is easily visible that can be easily applied (by spraying, for example) to and evenly distributed on a surface, that does not run or drip when applied to a vertical surface, that does not become imbedded in the surface to be sanded (a gel coat covered boat surface, for example), that dries quickly or instantaneously upon application, that is film forming at room temperature, that is easily sanded, that is water resistant for wet sanding, that is useful on a variety of surfaces, that is less likely to stain newly sanded surfaces, and which can be formulated to increase the cut rate of a coated abrasive article which is used in the sanding operation and decrease the loading of the coated abrasive article. The "cut rate" refers to the amount of material (such as paint or gelcoat) that is removed over a set amount of time by virtue of the abrasive article.

The present invention provides a gel composition comprising:

(a) a component selected from the group consisting of aqueous dispersion(s) comprising a binder(s), aqueous emulsion(s) comprising a binder(s), and combinations thereof, wherein the component has a minimum film forming temperature of 22° C. or less;

(b) a thickening agent of a type and in a sufficient amount to provide the composition with Bingham plastic properties when shear is applied to the composition;

(c) optionally additional water beyond that which is present due to the aqueous nature of the component of element (a);

(d) a water dispersible inorganic pigment(s); and (e) optionally a pH adjusting agent;

wherein the pH of the composition falls within the range of about 6 to about 9.

The present invention also provides a method of sanding a substrate comprising the steps of:

(I) providing a gel composition comprising:

(a) a component selected from the group consisting of aqueous dispersion(s) comprising a binder(s), aqueous emulsion(s) comprising a binder(s), and combinations thereof, wherein the component has a minimum film forming temperature of 22° C. or less;

(b) a thickening agent of a type and in a sufficient amount to provide the composition with Bingham plastic properties when shear is applied to the composition;

(c) optionally additional water beyond that which is present due to the aqueous nature of the component of element (a);

(d) a water dispersible inorganic pigment(s); and (e) optionally a pH adjusting agent;

wherein the pH of the composition falls within the range of about 6 to about 9;

(II) applying a stress to the gel composition to reduce its viscosity to one at which it may be sprayed on a substrate;

(III) spraying the reduced viscosity composition onto a substrate to be sanded;

(IV) distributing the composition over the substrate to be sanded, wherein the composition at least partially dries during the step of distributing, and wherein a visible color contrast exists between the composition and the substrate to be sanded;

(V) optionally allowing the composition to further dry;

(VI) sanding the substrate over the composition; and (VII) optionally repeating steps (II) to (VI), one or more times.

DETAILED DESCRIPTION OF THE INVENTION

Aqueous Emulsion(s)/Dispersion(s) Comprising Binder(s)

The composition of the present invention comprises a component selected from the group consisting of aqueous dispersion(s) comprising a binder(s), aqueous emulsion(s) comprising a binder(s), and combinations thereof The component has a minimum film forming temperature of 22° C. or less. In other words, the component will form a film at 22° C. or less.

The binder present in the component serves to bind the pigment to the substrate to which the guide coat is applied. If the binder were not present the dried guide coat could wash off with water which is disadvantageous since wet sanding is a common form of sanding. Thus the dried coating of the invention is water resistant. For example, the dried guide coat will not wash off merely upon the application of water via a cloth.

Useful binders typically have a glass transition temperature of less than about 100 degrees C., a number average molecular weight of less than about 200,000, an acid number (NV) of less than 150, and water resistance. Preferably the binders are free of acrylamide and other potentially toxic monomers.

Examples of suitable binders include but are not limited to those selected from the group consisting of acrylic, urethane, and epoxy polymers. Acrylic polymers are preferred as binders. Examples of preferred acrylic polymers include those selected from the group consisting of the Joncryl series of polymers available from Johnson Wax.

The composition of the invention should contain a sufficient amount of binder in order to bind at least some of the pigment, preferably all of the pigment, to the intended substrate. Typically the composition of the invention comprises a sufficient amount of a component selected from the group consisting of aqueous dispersion(s) comprising binder (s), aqueous emulsion comprising binder(s), and combinations thereof such that the composition comprises at least about 0.03 percent by weight binder, preferably about 0.03 to about 10 percent by weight binder, and most preferably about 0.03 to about 5 weight percent binder, based upon the total weight of the composition. The component comprising the binder of the invention is preferably an emulsion having a small particle size.

Thickening Agent

The composition of the present invention comprises a thickening agent in an amount and of a type which provides the composition with Bingham plastic properties when shear is applied to the composition. The terms "Bingham plastic" and "Bingham fluid" are used interchangeably herein. This thickening agent provides the composition with a high enough viscosity so that the guide coat composition, when sprayed onto a vertical surface, does not drip or run. Typically this is determined by viewing the sprayed composition on the vertical surface for a period of ten minutes. The composition of the invention containing this thickening agent should shear thin when subjected to the shear exerted by a typical trigger sprayer.

Examples of such thickening agents include but are not limited to those selected from the group consisting of activated Carbopol™ resins. Carbopol™ resins are water soluble vinyl polymers available from B.F. Goodrich. They are discussed in the following product bulletin: CARBOPOL® THICKENERS FOR INDUSTRIAL APPLICATIONS, THICKENING & SUSPENDING WITH CARBOPOL® THICKENERS, NUMBER ONE IN A SERIES, BF Goodrich, April 1995. Other useful thickening agents include but are not limited to activated Laponite resins. Laponite resins are synthetic smectite clay materials available from Southern Clay Products, Gonzales, Tex., USA, 78629.

According to the manufacturer, B.F. Goodrich, Carbopol™ resins are high molecular weight polyacrylic acid, crosslinked with polyalkenyl polyether. Carbopol™ resins have an average equivalent weight of 76. According to the manufacturer they are amorphous polymers with a particle size of 3–10 microns, a glass transition temperature (Tg) of 100–105 degrees C., an acid number of 675–725, an equivalent weight of 76 (plus or minus 4), and a pKa of 6.0 (plus or minus 0.5). Carbopol™ resins have the ability to absorb and retain water, thus swelling up to 2000 times their original volume. Swollen Carbopol™ resins remain as discrete polymer colloid aggregates or microgels. An aqueous dispersion of such microgels exhibits plastic rheology, i.e., shear-thinning with a definite yield stress. This is non-Newtonian behavior. According to the manufacturer, Carbopol™ resins are best characterized as having non-Newtonian Bingham Plastic flow, e.g., Ellis model. In the case of Bingham and Ellis plastic flow, a minimum shear stress is required to initiate flow. This minimum stress is know as the yield stress. Yield value can easily be seen in neutralized gels of Carbopol™ resins which at rest are stiff strong gels, but flow easily when enough force is applied. Other materials, with similar properties would be expected to be useful.

Laponite RDS is a rheological additive which is a synthetic layered silicate incorporating an inorganic polyphosphate peptizer. It hydrates and swells in water to give clear and colorless colloidal dispersions of low viscosity (sols) at concentrations of up to 10 percent. It will form thixotropic clear gels with the addition of small quantities of electrolytes (i.e., upon activation). A typical chemical analysis of this product is $SiO_2$ 54.5 weight percent, MgO 26.0 weight percent, $Li_2O$ 0.8 weight percent, $Na_2O$ 5.6 weight percent, $P_2O_5$ 4.1 weight percent, and loss on ignition 8.0 weight percent.

Laponite materials are magnesium silicates with a layered structure and are marketed as granular, free flowing white powders. According to the manufacturer when the powders are dispersed in water they form thixotropic gels, or, if the solforming grades are used, clear stable sols. These sols can be changed into thixotropic gels if or when required. The layered structure of these products is identical to that of natural hectorite. When a Laponite product is mixed with distilled or deionized water, the exchangeable cations, largely sodium, dissociate and the resultant negatively charged platelets repel each other giving a colloidal dispersion which looks and flows like water. This is called a sol. As electrolyte is added to a dispersion in distilled or deionized water the negatively charged layer on the surface of the clay is reduced until the repulsion between the negatively charged platelet surface is insufficient to prevent bond formation between these surfaces and the weakly positively charged platelet edges. The clay particles within the fluid bond together edge to face. This results in the formation of a gel. The gel systems produced form dispersions of these products in water which do not behave as Newtonian fluids, but instead behave like Bingham fluids. A Newtonian fluid is one with which flow is directly proportional to the applied shearing stress. A Bingham fluid is one where a measurable shear stress has to be applied before flow will commence, however once flow commences, the fluid will act in the same way as a Newtonian fluid. Laponite™ materials are discussed in the following bulletins: General Laponite™ Brochure; Laponite™ Inorganic Colloids; Laponite™ Synthetic Clays-General Information; Laponite™ Product Bulletin; Laponite™ RDS, Rheological Additive, all available from Southern Clay Products, Gonzales, Tex., USA 78629. Other materials, with similar properties, would be expected to be useful.

Water Dispersible Pigment

Useful water dispersible pigments include both organic and inorganic pigments and combinations thereof. Preferably the water dispersible pigments are volatile organic compound free, possess good hiding power, and possess small Hegman grind values. The pigment should be selected and used in an amount such that a contrast is obtained with the substrate the guide coat of the invention is used on.

Examples of preferred water dispersible pigments include but are not limited to those selected from the group consisting of Covan Phthalo Blue, Covan Calcium Red, and Covan Aquasperse Blue pigment (all available from Huls America Incorporated). The composition of the invention may have a variety of colors including but not limited to those selected from the group consisting of red, orange, yellow, green, blue, indigo, violet, and black.

Typically the composition of the invention comprises at least about 0.1 percent by weight water dispersible pigment based upon the total weight of the composition, preferably about 0.3 to about 5 percent by weight water dispersible pigment, and most preferably about 0.4 to about 2 percent by weight water dispersible pigment.

Water

The composition of the present invention optionally comprises water which may added in addition to that which is present due to the component selected from the group consisting of the aqueous dispersion(s) comprising binder (s), aqueous emulsion(s) comprising binder(s), and combinations thereof, and any other component which may optionally be added in an aqueous form to the composition (pigment, for example). This additional water is typically deionized (DI) in order to provide a more stable composition and discourage microbiological growth. Water functions as a carrier in the composition of the invention.

The composition of the present invention should preferably comprise a suitable amount of water, regardless of source, such that the composition is capable of being sprayed onto a substrate. Typically the composition of the invention comprises about 40 to about 99.82 percent by weight water regardless of the source based upon the total weight of the composition, preferably about 80 to about 98 weight percent.

Optional Components

The composition of the invention can optionally further comprise one or more additives selected from the group consisting of pH adjusting agents, antiloading agents, biocides, fungicides, activating agents, etc.

An activating agent such as a base such as triethanolamine is optionally included in the composition of the invention in order to activate the material, if necessary which is to function as the thickening agent. In the case of a Carbopol™ resin an activating agent such as a base or a surfactant can be used to activate (uncoil) the thickening agent by converting the acid, into the salt causing electrostatic repulsion. This typically occurs at a pH of 5 to 8 depending on the particular resin. Beyond pH 8 range the viscosity decreases. Unless the Carbopol™ resin is activated, it remains tightly coiled and the composition will be too thin. A sufficient amount of an activating agent should be included to activate the material, if the material is the type which requires activation.

A sufficient amount of a pH adjusting agent such as a base may also be included in the composition of the invention in to order provide the composition with a pH between about 6 and about 9, preferably between about 6.5 and about 8.5, and most preferably between about 7 to about 8, even when not actually required to activate a thickening agent. A composition close to a neutral pH is advantageous since it is less likely to stain or etch a paint coated surface which it may be used on.

Examples of suitable antiloading agents include but are not limited to those selected from the group consisting of primary stearates such as zinc stearate, calcium stearate, magnesium stearate, and mixtures thereof These antiloading agents help prevent sanding swarf (sanding dust) from adhering to the surface of the coated abrasive article (such as a sanding disk) used in sanding over the guide coat of the invention. By minimizing the, amount of swarf which adheres to the coated abrasive article, the abrasive particles' sharp edges are exposed to the substrate and can cut for a longer period of time.

The composition of the invention typically comprises about 0 to about 50 percent by weight of an antiloading agent (typically about 0.1 to about 50 percent by weight if included), preferably about 1 to about 15 percent by weight based upon the total weight of the composition.

The composition of the invention may optionally further comprise an organic cosolvent. However, it is preferred for environmental reasons to avoid organic cosolvents.

Features of the Composition of the Invention

The composition of the invention exhibits non-Newtonian Bingham Plastic flow. These are materials that at rest are stiff, strong gels, but flow easily when enough force is applied to overcome yield value. This allows the composition to be stirred, pumped, sprayed and spread easily. Thixotropic materials exhibits shear thinning but the gel or increased viscosity develops with time, not instantaneously. The composition of the invention recovers viscosity instantaneously. The composition of the invention is preferably sprayable by conventional sprayers such as a trigger bottle sprayer. The composition of the invention preferably has the following rheological properties. The composition preferably has a high yield value. Yield value is defined as the initial resistance to flow under applied stress.

The components making up the composition of the invention and the composition itself is preferably completely free of volatile organic compounds. Preferably the components making up the composition of the invention and the composition itself is free of acrylonitrile and any other potentially toxic acrylic monomers.

The composition of the invention preferably has a minimum film forming temperature of 22° C. or less. In other words, it will preferably form a film at 22° C. or less.

The composition of the invention has good water resistance properties. By this it is meant that it will not wash off the substrate to be sanded with water after it has been distributed and dried.

The composition of the invention is preferably fast drying. By this it is it meant that it dries within about 20 seconds after distribution is commenced (by wiping, for example) more typically about 10 to about 20 seconds. This can occur even if the distribution step does not occur during the entire time. For example, it typically dries within about 20 seconds after distribution is commenced even if the distribution step only lasts about 5 seconds. It will also typically dry within about 20 seconds after distribution is commenced even if distribution occurred during the entire 20 second time period. However, it will not dry in that amount of time if merely sprayed on a surface but not distributed.

The composition of the invention can be removed in case of over spray with 3M SHARPSHOOTER Extra Strength No Rinse Cleaner (greater than 90 percent water, -7 percent 2-butoxyethanol, -5 percent ethoxylated secondary alcohols, -5 percent ethoxylated alcohol, -5 percent ethanolamine, and less than 1 percent potassium hydroxide).

Preparation of the Composition of the Invention

The composition of the invention can be prepared by combining the components in any order. Typically, the composition of the invention is prepared by charging water into a suitable vessel, followed by thickening agent, followed by pH adjusting agent, if included, followed by the remaining materials. Agitation typically occurs throughout the preparation process.

Method of Use of the Composition of the Invention

The guide coat composition of the invention is typically applied by spraying it onto the desired substrate and wiping with a towel or sponge or cloth or other spreading device to distribute (preferably evenly distribute) the guide coat composition over the area to be sanded. The guide coat is allowed to dry for a brief period of time (typically about 10 to about 20 seconds after distributing). The area in which the guide coat has been applied can then be sanded. The dried guide coat can be dry and/or wet sanded. It will not come off with either plain or soapy water. It can be however, effectively removed with a product such as 3M SHARPSHOOTER Extra Strength No Rinse Cleaner. Wet sanding is used by some to fair (make flat) a surface. If the guide coat could be removed with water this sanding step would remove all the guide coat, thus defeating its intended purpose. The composition of the present invention is advantageous in that upon drying it does not come off with merely water or soapy water alone, thus making wet sanding over the dried coating possible.

The nature of the guide coat composition varies during the above described method. The guide coat composition is initially that of the gel. It is liquefied upon pulling the trigger of the sprayer. This is due to stress exerted on the composition by the sprayer which causes its viscosity to drop to that of water enabling it to be sprayed. When the stress on the composition is relieved (immediately upon leaving the nozzle) its viscosity returns to that of a gel. Thus it is deposited on the intended substrate in a gel state. During the distribution step (wiping etc.) it typically is liquefied. This is because wiping, etc. can exert enough stress onto the composition to cause its viscosity to drop to that of water. Upon drying, the composition is neither a gel nor a liquid but a solid dry coating.

EXAMPLES

The present examples further illustrate but do not limit the present invention. All parts, percentages, ratios, etc. in the examples are by weight unless indicated otherwise.

Example 1

A gel guide coat composition of the invention was prepared from the following components: Deionized (DI) water (96.44 percent by weight), Carbopol™ EZ-1 acrylic polymer thickening agent (0.19 percent by weight), triethanolamine (TEA) base (0.77 weight percent), Joncryl 95 aqueous emulsion containing acrylic polymer binder component (0.19 weight percent), Covan Phthalo Blue water dispersible pigment (1.93 weight percent), and Covan Calcium Red water dispersible pigment (0.48 weight percent). Covan pigments are available from Huls America Inc., Piscataway, N.J., USA. The weight percentages are based upon the total weight of the composition.

The components were combined as follows:

The deionized water was charged into an approximately 16 ounce (0.473 liter) jar. The thickening agent was added to the water and mixed with an air powered mixer with a propeller (low shear) type blade for about 15 minutes until the thickening agent dissolved. Triethanolamine was slowly added to the jar and the jar contents were mixed for an additional 10 minutes. Next, the Joncryl 95 aqueous emulsion acrylic polymer binder component was added to the jar, and the jar contents were mixed for 5 minutes. The pigments were then added to the jar and the contents were mixed for an additional 15 minutes.

Example 2

Method of Using the Composition of the Invention

The gel guide coat composition of Example 1 was placed in a trigger spray bottle of a 32 ounce (0.946 liter) size. The guide coat composition was held approximately 8 to 12 inches (20 to 30 cm) from a vertically positioned surface to be sanded. The surface to be sanded was a fiberglass panel having a polyester gel coat surface which was white in color. The guide coat composition did not run down the surface on which it was sprayed. After several squirts of the guide coat composition were applied to the gel coat, the guide coat composition was spread over the gel coat using a paper towel. After about 10 seconds for drying, a first half of the coated surface was sanded with 255L P600 sandpaper, following which the guide coat composition was reapplied and distributed as described above over the sanded area. Dry sanding over the same first half with a finer sandpaper occurred next. The second half of the gel coat which had guide coat composition previously applied as described above, was wet sanded with 401Q 1200 sandpaper. Following the wet sanding, the guide coat composition was reapplied and distributed over the second half as described above followed by additional wet sanding with 1500 WOD (wet or dry) sandpaper (a finer sandpaper) until all sanding scratches were removed. (All sandpapers used are available from the Minnesota Mining and Manufacturing Company).

Examples 3a–3i

Effect of Concentration of Binder Component Joncryl 95

The procedure of Example 1 was followed except for the following modifications to components and amounts listed below: The amount of Joncryl 95 acrylic polymer binder component concentration was varied as listed below. The varying amounts of Joncryl 95, which were 10, 8, 6, 4, 2, 1, 0.5, 0.25, and 0.10 parts by weight, corresponded to Examples 3a–3i, respectively.

| Raw Materials | Parts by Weight |
| --- | --- |
| Carbopol ™ EZ-1 | 0.20 |
| DI Water | 40.00 |
| TEA (50%) | 0.40 |
| Joncryl 95 | 10, 8, 6, 4, 2, 1, 0.5, 0.25, 0.10 |
| Covan Phthalo Blue R/S Water Dispersible Pigment | 1.00 |

Each of the compositions was separately applied and tested via the sanding procedures set out in Example 2. Prior to sanding, sections of the dried guide coat were wiped with water and a paper towel to determine if any of the guide coats were removable with water alone. None of the guide coats washed off with water. All compositions were effectively sanded away by each sanding procedure. The results indicated that decreasing the amount of the Joncryl 95 binder component did not have any effect on the binding power of the acrylic binder.

The purpose of Examples 4a and 4b was to determine the affect of pigment concentration on the compositions of the invention.

Example 4a

Effect of Pigment Concentration

The procedure of Example 1 was followed except for the following components and amounts which were used: Deionized water (97.66 percent by weight), Carbopol™ EZ-1 acrylic polymer thickening agent (0.195 percent by weight), triethanolamine (TEA) base, (0.78 weight percent), Joncryl 95 aqueous emulsion containing acrylic polymer binder component (0.39 weight percent), and Covan water dispersible pigment (0.5 weight percent).

Example 4b

Effect of Pigment Concentration

The procedure of Example 1 was followed except for the following components and amounts were used: Deionized water (98.43 percent by weight), Carbopol™ EZ-1 acrylic polymer thickening agent (0.197 percent by weight), triethanolamine (TEA) base (0.787 weight percent), Joncryl 95 aqueous emulsion containing acrylic polymer (0.394 weight percent), and Covan water dispersible pigment (0.1 weight percent).

The compositions of both Examples 4a and 4b were each separately applied on a substrate as disclosed in Example 2 following the procedure of Example 2. The composition of Example 4a contained a suitable amount of a pigment of a suitable color such that the composition upon application provided a sufficient contrast with the white substrate such that the guide coat composition was visible to the naked eye. The composition of Example 4b did not contain a sufficient amount of pigment of a color that presented a visual contrast with the white substrate when viewed with the naked eye.

Examples 4a and 4b demonstrate that the color of the intended substrate needs to be taken into account when determining the type and amount of pigment to be included in the guide coat composition. A pigment which may provide a sufficient visible contrast on one substrate may not provide a sufficient visible contrast on a different colored substrate.

Example 5

The procedure of Example 1 was followed except for the substitution of the following components and amounts:

Deionized Water (98.62 parts by weight);

Carbopol™ EZ-1 thickening agent (0.197 parts by weight);

TEA (0.789 parts by weight);

Joncryl 95 binder component (0.197 parts by weight); and

Covan Aquasperse Blue water dispersible pigment (1.972).

The guide coat composition was applied, dried, and evaluated for its ability to be washed off with water as described in Examples 3a–3i. The guide coat composition did not wash off.

Comparative Examples 6a–6b and Examples 6c–6d

Effect of Thickening Agent

Four separate compositions were prepared. The thickening agent used for each composition was different. The thickening agents used are set out in TABLE 2. The components used and their amounts are as follows: Deionized (DI) water (50 parts by weight), thickening agent (0.1 parts by weight), triethanolamine (TEA) base (0.4 parts by weight), Joncryl 95 aqueous emulsion containing acrylic polymer binder component (1.0 parts by weight), Covan water dispersible pigment (1.5 parts by weight) Covan pigments are available from Huls America Inc., Piscataway, N.J., USA.

The components were combined as follows:

The deionized water was charged into an approximately 16 ounce (0.473 liter) jar. The thickening agent was added to the water and mixed with an air powered mixer with a propeller (low shear) type blade for about 15 minutes until the thickening agent dissolved. Triethanolamine was slowly added to the jar and the jar contents were mixed for an additional 10 minutes. Next, the Joncryl 95 aqueous emulsion acrylic polymer binder component was added to the jar, and the jar contents were mixed for 5 minutes. The pigments were then added to the jar and the contents were mixed for an additional 15 minutes.

TABLE 2

| Example | Thickening Agent | Result |
| --- | --- | --- |
| Comp. 6a | Cellosize QP440H[1] | ran after spraying |
| Comp. 6b | Cellosize QP30,000H[2] | ran after spraying |
| Ex. 6c | Carbopol ™ EZ-1[3] | stayed on surface |
| Ex. 6d | Carbopol ™ EZ-2[4] | stayed on surface |

[1] An ethoxylated cellulose material used for thickening available from Union Carbide, Danbury, Connecticut, USA
[2] An ethoxylated cellulose material used for thickening available from Union Carbide, Danbury, Connecticut, USA
[3] acrylic polymer thickening agent available from B. F. Goodrich
[4] acrylic polymer thickening agent available from B. F. Goodrich Each composition was separately sprayed on the substrate disclosed in Example 2 following the same procedure as Example 2. The compositions were observed after spraying. No attempts were made to spread the compositions. Compositions which immediately began to run after spraying on the substrate are identified by the phrase "ran after spraying". Compositions which did not run at all in a ten minute observation period after spraying are identified by the phrase "stayed on surface".

These examples demonstrate that the use of a thickening agent capable of providing the composition with Bingham plastic properties is critical to the present invention.

Examples 7a and 7b

Use of Different Binder Components

The procedure of Example 1 was followed except for the components used and amounts which are listed in the TABLE 1 below.

TABLE 1*

| Ingredients | Ex. 7a | Ex. 7b |
| --- | --- | --- |
| Carbo Cure FF-5[1] from B. F. Goodrich Specialty Chemicals, Cleveland, OH | 1.0 | 0 |
| Joncryl 95[2] | 0 | 1.0 |
| Carbopol ™ EZ-1 (thickening agent) | 0.1 | 0.1 |
| DI Water | 50 | 50 |
| TEA | 0.4 | 0.4 |
| Covan Water Dispersible Pigment | 1.51 | 1.5 |

*Ingredients listed are in parts by weight
[1] a formaldehyde-free acrylic dispersion binder component with a film-forming temperature of less than −5 degrees F. (−20.55 degrees C.)
[2] a binder component having film-forming properties at 22 degrees C.

Each of the guide coat compositions was separately applied onto the substrate disclosed in Example 1 following the procedure of Example 2 and allowed to dry. Each dried coat was wiped with water and a paper towel to determine if it was removable with water alone. Both compositions demonstrated sufficient water resistance that wet sanding could be performed with either composition. The Joncryl 95 component, however, provided superior water resistant properties.

Various modifications and alterations of this invention will become apparent to those skilled in the art without departing from the scope and spirit of this invention, and it should be understood that this invention is not to be unduly limited to illustrative embodiments set forth herein.

The following is claimed:

1. A gel composition comprising:
  (a) a component selected from the group consisting of aqueous dispersion(s) comprising a binder(s), aqueous emulsion(s) comprising a binder(s), and combinations thereof, wherein the component has a minimum film forming temperature of 22° C. or less;
  (b) a thickening agent of a type and in a sufficient amount to provide the composition with Bingham plastic properties when shear is applied to the composition;
  (c) optionally additional water beyond that which is present due to the aqueous nature of the component of element (a);
  (d) a water dispersible inorganic pigment(s); and
  (e) optionally a pH adjusting agent;
  wherein the pH of the composition falls within the range of about 6 to about 9.

2. The composition of claim 1 which further comprises an antiloading agent.

3. The composition of claim 2 wherein the antiloading agent is selected, from the group consisting of magnesium stearate, zinc stearate, calcium stearate, and mixtures thereof.

4. A gel composition comprising:
  (a) a component selected from the group consisting of aqueous dispersion(s) comprising a binder(s), aqueous emulsion(s) comprising a binder(s), and combinations thereof, wherein the component has a minimum film forming temperature of 22° C. or less, and wherein a sufficient amount of the component is present such that the composition comprises at least about 0.03 weight percent binder based upon the total weight of the composition;
  (b) about 0.5 to about 20 weight percent of a thickening agent of a type and in a sufficient amount to provide the composition with Bingham plastic properties when shear is applied to the composition;
  (c) optionally additional water beyond that which is present due to the aqueous nature of the component of element (a);
  (d) at least about 0.1 weight percent of a water dispersible inorganic pigment(s); and
  (e) optionally a pH adjusting agent;
  wherein the pH of the composition falls within the range of about 6 to about 9; and
  wherein the total amount of water present in the composition, from whatever source, ranges from about 40 to about 99.82 weight percent based upon the total weight of the composition.

5. The composition of claim 4 wherein a sufficient amount of the component selected from the group consisting of aqueous dispersion(s) comprising a binder(s), aqueous emulsion(s) comprising a binder(s), and combinations thereof is present such that the composition comprises at least about 0.03 to about 10 weight percent binder, based upon the total weight of the composition.

6. The composition of claim 4 wherein a sufficient amount of the component selected from the group consisting of aqueous dispersion(s) comprising a binder(s), aqueous emulsion(s) comprising a binder(s), and combinations thereof, is present such that the composition comprises about 0.03 to about 5 weight percent binder, based upon the total weight of the composition.

7. The composition of claim 4 wherein about 0.3 to about 5 weight percent of a water dispersible inorganic pigment(s) is present based upon the total weight of the composition.

8. The composition of claim 4 wherein about 0.4 to about 2 weight percent of a water dispersible inorganic pigment(s) is present based upon the total weight of the composition.

9. The composition of claim 4 wherein the pH of the composition falls within the range of about 6.8 to about 8.5.

10. The composition of claim 9 wherein the pH of the composition falls within the range of about 7 to 8.

11. The composition of claim 4 wherein the total amount of water present in the composition, from whatever source, ranges from about 80 to about 98 weight percent based upon the total weight of the composition.

12. The composition of claim 4 wherein the thickening agent is selected from the group consisting of activated polyacrylic acid crosslinked with polyalkenyl polyether and activated synthetic smectite clay.

13. The composition of claim 4 wherein the binder(s) have a glass transition temperature of less than about 100 degrees C., a number average molecular weight of less than about 200,000, and an acid number of less than 150.

14. The composition of claim 4 wherein the binder(s) are selected from the group consisting of acrylic polymers, urethane polymers, and epoxy polymers.

15. The composition of claim 4 wherein the binder(s) are acrylic polymers.

16. The composition of claim 4 which further comprises about 0.1 to about 50 weight percent of an antiloading agent, based upon the total weight of the composition.

17. A gel composition comprising:
(a) a component selected from the group consisting of aqueous dispersion(s) comprising a binder(s), aqueous emulsion(s) comprising a binder(s), and combinations thereof, wherein the component has a minimum film forming temperature of 22° C. or less, and wherein a sufficient amount of the component is present such that the composition comprises about 0.03 to about 10 weight percent binder(s) based upon the total weight of the composition;
(b) about 0.5 to about 20 weight percent of a thickening agent of a type and in a sufficient amount to provide the composition with Bingham plastic properties when shear is applied to the composition;
(c) optionally additional water beyond that which is present due to the aqueous nature of the component of element (a);
(d) about 0.1 to about 5 weight percent of a water dispersible inorganic pigment(s); and
(e) optionally a pH adjusting agent;
wherein the pH of the composition falls within the range of about 6.8 to about 8.5;
wherein the total amount of water present in the composition, from whatever source, ranges from about 80 to about 98 weight percent based upon the total weight of the composition.

18. The composition of claim 17 which further comprises an antiloading agent.

19. The composition of claim 18 wherein the antiloading agent is selected from the group consisting of magnesium stearate, zinc stearate, calcium stearate, and mixtures thereof.

20. The composition of claim 17 wherein the pH of the composition falls within the range of about 7 to 8.

21. The composition of claim 17 wherein the thickening agent is selected from the group consisting of activated polyacrylic acid crosslinked with polyalkenyl polyether and activated synthetic smectite clay.

22. The composition of claim 17 wherein the binder(s) have a glass transition temperature of less than about 100 degrees C., a number average molecular weight of less than about 200,000, and an acid number of less than 150.

23. The composition of claim 17 wherein the binder(s) are selected from the group consisting of acrylic polymers, urethane polymers, and epoxy polymers.

24. The composition of claim 17 wherein the binder(s) are acrylic polymers.

25. The composition of claim 17 which further comprises about 0.1 to about 50 weight percent of an antiloading agent, based upon the total weight of the composition.

26. A gel composition comprising:
(a) a component selected from the group consisting of aqueous dispersion(s) comprising a binder(s), aqueous emulsion(s) comprising a binder(s), and combinations thereof, wherein the component has a minimum film forming temperature of 22° C. or less, and wherein a sufficient amount of the component is present such that the composition comprises about 0.03 to about 5 weight percent binder, based upon the total weight of the composition;
(b) about 0.5 to about 20 weight percent of a thickening agent of a type and in a sufficient amount to provide the composition with Bingham plastic properties when shear is applied to the composition;
(c) optionally additional water beyond that which is present due to the aqueous nature of the component of element (a); (d) about 0.1 to about 2 weight percent of a water dispersible inorganic pigment(s); and
(e) optionally a pH adjusting agent;
wherein the pH of the composition falls within the range of about 7 to 8;
wherein the total amount of water present in the composition, from whatever source, ranges from about 80 to about 98 weight per cent based upon the total weight of the composition.

27. The composition of claim 26 which further comprises an antiloading agent.

28. The composition of claim 27 wherein the antiloading agent is selected from the group consisting of magnesium stearate, zinc stearate, calcium stearate, and mixtures thereof.

29. The composition of claim 26 wherein the thickening agent is selected from the group consisting of activated polyacrylic acid crosslinked with polyalkenyl polyether and activated synthetic smectite clay.

30. The composition of claim 26 wherein the binder(s) have a glass transition temperature of less than about 100 degrees C., a number average molecular weight of less than about 200,000, and an acid number of less than 150.

31. The composition of claim 26 wherein the binder(s) are selected from the group consisting of acrylic polymers, urethane polymers, and epoxy polymers.

32. The composition of claim 26 wherein the binder(s) are acrylic polymers.

33. The composition of claim 26 which further comprises about 0.1 to about 50 weight percent of an antiloading agent, based upon the total weight of the composition.

* * * * *